United States Patent [19]

Rosenblum

[11] Patent Number: 4,873,304

[45] Date of Patent: Oct. 10, 1989

[54] ORGANOMETALLIC POLYMER

[75] Inventor: Myron Rosenblum, Lexington, Mass.

[73] Assignee: Brandeis University, Waltham, Mass.

[21] Appl. No.: 119,024

[22] Filed: Nov. 10, 1987

[51] Int. Cl.$^4$ .................. C08G 79/00; C08G 83/00
[52] U.S. Cl. .................................. 528/9; 528/397
[58] Field of Search .................... 528/9, 397

[56] References Cited

U.S. PATENT DOCUMENTS 3,437,634  4/1969  Neuse ................................. 260/47
3,504,052  3/1970  Neuse et al. ....................... 260/836

OTHER PUBLICATIONS

Lee, M.-T. et al., *Organometallics* 3:539–547, 1985.
Katz, T. J. and J. Pesti, *J. Am. Chem. Soc.* 104:346–347, 1982.
Neuse, E. W. and L. Bednarik, *Transition Metal Chemistry* 4:87–94, 1979.
Felkin, H. and G. Swierczewski, *Tetrahedron* 31:2735–2748, 1975.
Sudhakar, A., T. J. Katz and B.-W. Yang, *J. Am. Chem. Soc.* 108:2790, 1986.

*Primary Examiner*—Harold D. Anderson
*Attorney, Agent, or Firm*—Hamilton, Brook, Smith & Reynolds

[57] ABSTRACT

Metallocene polymers characterized as being in a stacked configuration where the monomeric units are constrained to interact with one another across their cofacial cyclopentadienyl ring surfaces, and having the general structure

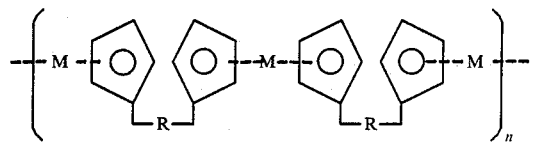

where M represents the metal and n is an integer of 2 or greater.

The preparative method involves the coupling reaction between a zincated metallocene and a dihalogen-substituted aromatic, in the presence of a catalyst. The mixture is refluxed, and the resultant polymer is taken up in organic solvent, washed, dried, separated and purified.

18 Claims, 1 Drawing Sheet a. M= Fe
b. M= Ru a. n= 1
b. n= 2
c. n= 3
d. n= 4
e. n= 5 a. n= 1
b. n= 2
c. n= 5
d. n= 6

1

ORGANOMETALLIC POLYMER

BACKGROUND

In the early nineteen fifties, a new organometallic compound was synthesized, originally named dicyclopentadienyl iron. Kealy, T. J. and P. L. Paulson, *Nature* 168, 1039 (1951). Soon after publication of the original papers describing this compound, its correct structure was proposed, Fischer, E. O. and W. Pfab, *Z. Naturaforsch.* 7b, 377 (1952), its aromaticity proved, hence the name "ferrocene", Rosenblum, M. et al., *J. Am. Chem. Soc.* 74, 3458 (1952) and the first dicyclopentadienyl complexes or other transition metals were synthesized (Fischer, E. O. and H. P. Fritz, *Adv. Inorg. Chem. Radiochem.* 1, 56 (1959).

Since then, there has been increasing interest in synthesis and properties of stacked columns of organometallic compounds. Among these materials are the multidecked nickelocenes in which two nickel atoms are located between three mutually parallel cyclopentadienyl rings, Werner, H. Angnew Chemie. *Int. Ed.* 16, 1-64 (1977). Columnar organometallics also include the related planar iron, cobalt, and nickel complexes of heterocyclic boron compounds such as the triborales, Beer, D. C. et al. *J. Am. Chem. Soc.* 95, 3046-3048 (1973) and diborales, Siebert, W. *Agnew Chemie Int. Ed.* 24, 943-958 (1985). Recently, a cobaltocenium salt of helicene, a helical structure of fused benzene rings capped by unsaturated 5-membered rings has been synthesized. Sudhakar et al. *J. Am. Chem. Soc.* 108, 2790-2791 (1986).

As exemplified by the iodine-doped phthalocyanate-metalloxanes, Hanack. M., *Chimia*, 37: 238 (1983) and the polyferrocenylenes, Neuse U.S. Pat. No. 3,437,634, polymeric organometallic complexes yield materials with unusual properties.

SUMMARY OF THE INVENTION

The present invention relates to a novel type of stacked organometallic polymer based on repeating, cofacial units of cycloaromatic complexes, which are held as substituents on a non-interacting hydrocarbon framework.

The metallocene units and hydrocarbon framework have the structure

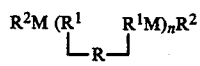

where $R^2$ can be the cyclopentadiene ring. $R^1$ can represent a ligand such as the arene, cycloheptatrienyl, and cyclopentadienyl ligands, M represents a transition metal, R represents a di-substituted aromatic compound and N is an integer of 2 or more.

In one embodiment of this invention, the cycloaromatic is the cyclopentadienyl ligand and the monomeric units are joined to a backbone of *peri*-substituted naphthalene. In these polymers, the metallic nucleus of the metallocene unit is a transition metal such as iron or ruthenium. In another embodiment of this invention, the polymeric units are joined through a backbone of a 1,4 di-substituted benzene.

DETAILED DESCRIPTION OF THE INVENTION

Figure 1:
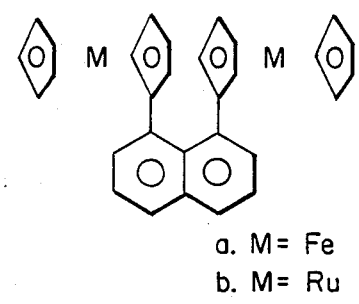
FIG. 1 illustrates the structural formula representing the 1,8 dimetallocenylnaphthalene monomers of this invention.
Figure 2:
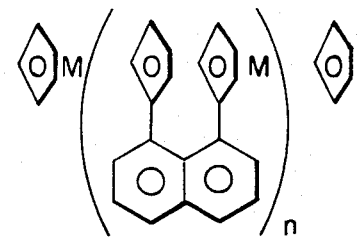
FIG. 2 illustrates the general formula for the 1,8 dimetallocenylnaphthalene oligomers of this invention.

As used herein, the term "oligomers" means a low molecular weight compound of repeating units in which the number of units (N) equals 2 to 10. Seymour, R. B. and E. E. Carraher, Jr., *Polymer Chemistry*, M. Dekkar, N.Y. (1981). The term "polymer" refers to compounds whose repeating unit structure may be less than ten but is usually greater than ten.

Polymers embodied in the present invention have the general structure:

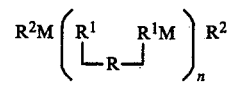

where $R^1$ and $R^2$ are cycloaromatic ligands, M is a metal and R is a disubstituted aromatic. Such cycloaromatics can be rings of five or more carbon atoms yielding metal sandwich-type compounds. For example, $R^1$ and $R^2$ might comprise the benzene ring, yielding a bis-arene metal complex. Cyclo-pentadienyl-arene mixed sandwich complexes are also contemplated where the $R^1$ and $R^2$ groups are not identical throughout the polymer. Furthermore, this invention can include synthesis of polymers containing complexes where $R^1$ is the cycloheptatrienyl ligand. Thus, it is possible to construct cyclo-pentadienyl-metal (cycloheptatrienyl) sandwich complexes as part of the polymeric structure.

In preferred embodiments of this invention, the $R^1$ group is the cyclopentadienyl ligand and the $R^2$ group is the electron-delocalized cyclopentadiene ring. The metal can be any transition metal, although polymers of iron and ruthenium are particularly preferred. In particular, one embodiment of this invention is a polymeric mixed-valence metallocene system in which the monomeric units, constrained to interact with one another through space across their cyclopentadienyl ring surfaces, are held face to face on a relatively rigid, noninteracting hydrocarbon framework.

A stacked polymer of the form:

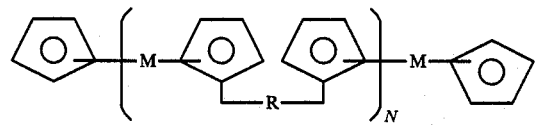

can be constructed employing such a non-interacting hydrocarbon framework to support the individual metallocene nuclei. When the melallocene units are held face to face and at an internuclear distance of 4 Å or less, electron or hole conduction in an array of such a polymer occurs through overlapping ring pi orbitals. Clearly, the ability of such stacked structures to be useful in, for example, electrical conduction, electrical storage, or photoconduction depends on the efficacy of conduction through the cyclopentadienyl-metal array. Polymers that are the subject of this invention are a novel type of stacked organometallic system based on the structure presented above, in which the individual cyclopentadienyl units are held proximate and cofacial as substitutents on an aromatic backbone. One property possessed by polymers of this type, useful in electronic applications, is a reversible electronic exchange between the metal centers in the polymer chain (Example IV).

Metallocenes can be exemplified by ferrocene ($R^1MR_1$; where $R^1$ is the cyclopentadienyl ring; M=Fe). Other metals can replace iron in compositions of this invention. In such polymers, M can be selected from metals both to the left and the right of iron in the Periodic Table. For example, polymers embodied in this invention are those whose metal moiety includes, but is not limited to, iron, ruthenium, osmium, nickel, molybdenum, vanadium, tungsten, niobium, rhenium or technetium, In this regard, the term "metallocene" is exemplified herein to mean a metal-aromatic sandwich of the form $R^1MR^1$. Preferred embodiments of this invention include polymers where $R^1$ is the cyclopentadienyl ring. As mentioned above, mixed sandwich polymers where the $R^1$ groups are not identical are also embodied in this invention. Many of the polymers specifically described in the exemplification are, however, those of ferrocene. This is due, in part, to the availability of nonbonding orbitals occurring on the metal moiety of the ferrocene unit. The availability of these electrons may account for the ease of oxidation and the facile electrophilic (Friedel Crafts-type) substitution reactions in the ferrocene unit.

For example, oxidations of a large number of metallocenes, including those embodied in this invention, through loss of one or more electrons from the metal ion, may be effected electrically, photolytically, or through organic and inorganic oxidations. Individual monomeric units of ferrocene, ruthenocene and osmocene (M-Fe, Ru, or Os) will give the paramagnetic ferricenium, ruthenicenium, and osmicenium cations, respectively. Page, J. A. and G. Wilkinson, *J. Am. Chem. Soc.* 74, 6149 (1952); Wilkinson, G. et al., *J. Am. Chem. Soc.* 74: 2125 (1952).

Synthesis of compositions embodied in the present invention is based on the selective cross-coupling of Grignard reagents with aryl and alkenyl halides in the presence of nickel or palladiumphosphine catalysts:

$$RMX + R'X' \rightarrow R - R' + MXX'$$

where M=Mg or Zn; X=I, Cl, Br.

In one embodiment of this invention, zincated metallocene is prepared from 1,1'-dilithioferrocene and 1,1 dilithioruthenocene by treatment of this metallocene with anhydrous zinc chloride. This complex is coupled with 1,8 diiodonaphthalene in the presence of a palladium catalyst, yielding low molecular weight polymeric matallocene in which the separate metallocene units are proximate and co-facial, held in that conformation by the bridging *peri* substituted naphthalene rings. When the ratio of zinc chloride to dilithiometallocene was 2:1, the major product of this palladium catalysed coupling reaction is primarily a monomeric unit with the following structure:

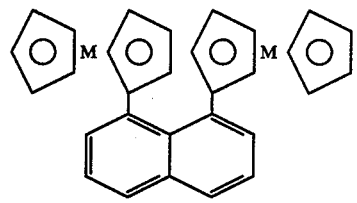

The yield of oligomeric and polymeric units surprisingly increases when the amount of zinc chloride is reduced to one molar equivalent zinc chloride. It has been discovered that small amounts of water or zinc hydroxide present in the zonc reagent results in conversion of dilithiometallocene, in part, to a monozincated metallocene. This leads to chain terminating coupling reactions. A comparison was made of the integrated cyclopentadienyl proton resonances obtained when solutions of 1,1 dilithioferrocene-TMEDA complex are quenched with deuterium oxide before and after treatment with increasing amounts of commercial "anhydrous" zinc chloride in diethyl ether. The results are shown in Table 1.

TABLE 1

| Deuterium Incorporation On Quenching Metallated Ferrocenes With $D_2O$ Relative proton integrations[a] | | | |
|---|---|---|---|
| Compound | Me[b] | Cp | Aromatic[b] |
| 1,1'dilithioferrocene-TMEDA complex | 3.0 | 7.9 | 4.7 |
| Complex + 4 equiv. $ZnCl_2$ | 3.0 | 10.1 | 4.9 |
| Complex + 2 equiv. $ZnCl_2$ | 3.0 | 8.7 | 4.8 |
| Complex + 1 equiv. $ZnCl_2$ | 3.0 | 8.3 | 4.9 |

[a]average of four integrations.
[b]internal standard toluene.

These results suggest the presence of a proton source in the zinc chloride solutions, which at a level of 4 molar equivalents of zinc salt per mole of dilithioferrocene, is capable of completely quenching the metallated ring. Contrary to simple stochiometry, polymer products derived from the metallocene-aromatic coupling reactions embodied in this invention, are more likely to form when the ratio of zinc chloride to dilithiometallocene is 1:1, rather than 2:1 or greater. The precise composition of the zincated metallocene reagent in these reactions cannot be predicted, but it is likely a mixture of the dimetallocenylzinc as well as the singly substituted chlorozincmetallocene. Therefore, in order to foreclose chain terminating processes, it is preferred to remove traces of water or hydroxyl end groups in the "anhydrous" zinc chloride regent by treating the salt with oxalyl chloride, either under reflux conditions or on prolonged standing at room temperature (Example III).

In other embodiments of this invention, zincated metallocenes are prepared and coupled with dihaloaromatics in the presence of palladium catalyst. The aromatics contain halogen groups that are 1,4-disposed with respect to each other on the aromatic ring. For example, formation of a polymeric series of metallocenes, in which 1,4 di-iodobenzene are coupled with ferrocenyl zinc, can be achieved as follows:

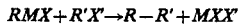

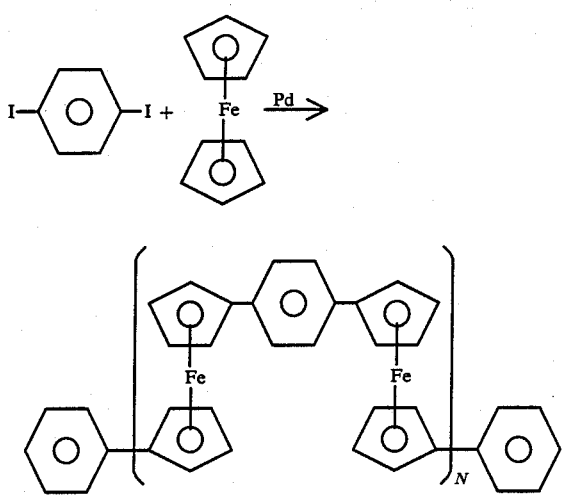

Other dihaloaromatics could be selected from the group consisting of 9,10 dihaloanthracene and 4,4'-dihalobiphenyl.

The invention will now be further and specifically illustrated by the following Examples.

EXAMPLE I

Preparation of Ferrocenylnaphthalene Oligomers

Reagents and Analytical Methods

Many of these polymers, particularly those of ferrocene, show sensitivity to air oxidation. The oxidized materials will precipitate progressively from benzene solutions of the polymers on exposure to air and, unlike the lower molecular weight oligomers are only partially resolubilized on treatment with bisulfite to remove oxygen. For this reason, all reactions are carried out under dry nitrogen or argon. Unless otherwise noted, all temperatures are in degrees Celsius.

Air and/or moisture-sensitive reagents are handled using standard syringe transfer techniques and flasks capped with rubber septa. Flexible double-tipped needles (cannulas) are used to transfer larger amounts (>10 mL) of liquid or reagents. Solvents are dried by standard procedures and stored under nitrogen and tetrahydrofuran is freshly distilled from sodium benzophenone ketyl prior to use.

In particular embodiments of this invention reactions were monitored by thin-layer chromatography on silica gel slides and by gel permeation chromtographyc on a 100 Å Ultrastyragel column (Waters) with THF as eluent at a flow rate of 1 ml/min. Preparative plates (product of Analytech Silica Gel GF, 1000 microns) were used to isolate products.

Ruthenocene (product of Polysciences), N,N,N',N'-tetramethylethylenediamine (TMEDA, product of Aldrich) and diisobutylaluminum hydride (DIBAL-H, Aldrich) were used as purchased. Butyllithium (2.5 M solution in hexanes, Aldrich)was assayed by titration with 2-butanol and 2,2'-dipyridyl or with 1,3-diphenylacetone p-tosylhydrazone as indicator. Anhydrous zinc chloride (ultrapure, product of Alfa) or a 1.0M solution in diethyl ether (Alfa) was used. 1,8-Diiodonaphthalene was prepared as described in the literature. House, H. O. et al., *J. Org. Chem.* 37:1003 (1972).

NMR spectra were recorded on a Varian X300 spectrometer and referenced to solvent $CHCl_3$. Electrochemical measurements were carried out under an argon atmosphere in methylene chloride which had been distilled from anhydrous $P_2O_5$ under a nitrogen atmosphere. Cyclic voltammograms were obtained using a Princeton Applied Research Model 173 potentiostat-galvanostat, a Model 175 current to voltage converter, and a Model 175 universal programmer. Data were recorded on a Bascom-Turner Model 3120T digital recorder at a digitization rate sufficient to record data points at 2 mV intervals or less. Potentials reported are at a Pt disk electrode and are reported vs. a saturated calomel electrode at a scan rate of 50 $mVsec^{-1}$.

Polymer molecular weights were determined using a Polymer Laboratory PLgel 500+10E4, 30 cm×7.8 mm column at 30° with toluene at 1 ml/min. Detectors were a Viscotek model 100 differentia viscometer, and a Waters R401 differential refractometer in series at 30°. Calibration was carried out using polystyrene standards.

Preparation of Ferrocenylnaphthalene Oligomers

A 100 mL schlenk flask was charged with 3.43 g (18.44 mmol) of ferrocene as a suspension in 25 mL of distilled hexane. This suspension was lithiated with two equivalents (36.88 mmol) of n-butyl lithium over the course of 15 min. The suspension was then treated with two equivalents (36.88 mmol) of TMEDA and allowed to stir at room temperature overnight. The pale orange powdered product (dilithioferrocene[TMEDA]$\frac{2}{3}$, isolated via cannula filtration, was dried under vacuum to yield 4.563 g of product (87%), which was stored in a drybox. This was used as a stock for subsequent coupling reactions.

Exactly 0.382 g (1.38 mmol) of the dilithioferrocene complex was dissolved in 20 mL of distilled THF. This orange solution was cooled to about 0° and treated with one molar equivalent of $ZnCl_2$ (1.38 mL of a 1 molar solution in ether). This was allowed to stir at about 0° for 0.5 h.

The Pd catalyst was prepared in situ in a roundbottom flask fitted with a reflux condenser which was capped by a side arm Schlenk adaptor. The catalyst was prepared by reducing 0.048 g (5 mole %) of $(PPh_3)_2PdCl_2$ with two equivalents of DIBAL-H in 2 mL of THF, yielding a black solution. The ferrocenyl zinc complex was then transferred via cannula into the catalyst solution, yielding a brown suspension. This suspension was brought to reflux.

A solution of 0.524 g (1.38 mmol) of di-iodonaphthalene in 5 ml of distilled THF was added dropwise down the reflux condenser over the course of 7.5 h. The progress of the reaction was monitored by gel permeation HPLC (Waters 100 A Ultra-styragel column, THF, 1 mL/min). The reaction mixture was allowed to reflux for one additional hour after the addition was complete at which point the HPLC shows no additional change in the product mixture.

The reaction was hydrolyzed by pouring the solution into 50 mL of saturated sodium chloride solution. Additional THF (20 mL) was added. The THF layer was removed and evaporated to dryness. The residue was then dissolved in $CH_2Cl_2$, dried over $MgSO_4$, filtered and evaporated to yield the crude product as a dark orange-red oily solid.

The crude product, dissolved in 12 mL of $CH_2Cl_2$, was separated by preparative TLC (8:2 hexane/$CH_2Cl_2$, required 12 plates). The first few bands (not orange) on each pale were discarded. The remaining five bands and the baseline were isolated from each plate, extracted into CH$_2$Cl$_2$, and evaporated to dryness to yield orange solids.

Of those isolated, band one gave the monomeric unit, 1,8-diferrocenylnaphthalene containing an uncharacterized impurity of higher molecular weight (V$_r$=6.77 mL).

Figure 4:
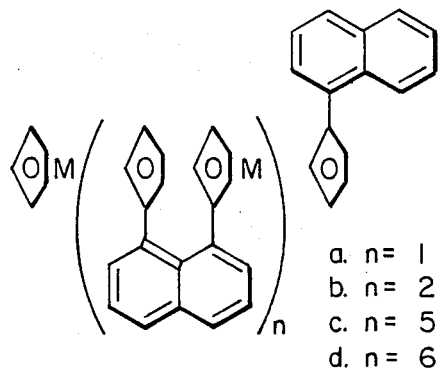
FIG. 4 illustrates the general formula for the low molecular weight polymers of this invention that contain equal numbers of naphthalene and metallocene units.

The second band is the 2:2 oligomer 4a, (FIG. 4). The numbers used herein as shorthand descriptors of structure (i.e., 2:2, 2:3, etc.) represent the numbers of naphthalene and metallocene units, respectively in the polymers and oligomers. This particular oligomer contained an inseparable impurity with V$_r$=6.46 mL. $^1$H NMR of 4a (FIG. 4) (CHCl$_3$) 8.3–6.9 (overlapping mult., 13H), 4.27 (t, J=1.8Hz, 2H), 4.23 (t, J=1.8Hz, 1H), 4.08 (t, J=1.8Hz, 2H) 4.06 (t, J=1.8Hz, 2H), 3.96 (t, J=1.8Hz, 1H), 3.85 (t, J=1.8Hz, 1H), 3.82 (s, 5H), 3.80 (t, J=1.8Hz, 2H), 3.76 (t, J=1.8Hz, 1H). MS (FD) m/e =622.

Band three contained the 2:3 oligomer 3a, (FIGS. 3) (71% pure by HPLC, R$_{vol}$=6.86 mL), with an impurity at V$_r$=6.22 mL. $^1$H NMR (CDCl$_3$) 8.0 (d, J=7.5Hz, 2H), 7.68 (d, J=7Hz, 2H), 7.62 (mult., 4H), 7.40 (t, J=7Hz, 2H), 7.06 (t, J=7Hz, 2H), 3.99 (br. s, 4H), 3.78 (s, 10H), 3.74 (br. s, 4H), 3.50 (br. s, 4H). MS (FD) m/e=806.

Band four gave the 3:3 oligomer 4b (FIG. 4) (94% pure by HPLC, V$_r$=6.53 mL). $^1$H NMR (CDCl$_3$) 8.3–6.9 (overlapping mult., 19H) 4.21 (t, J=1.8Hz, 1H), 40.03 (t, J=1.8Hz, 1H), 3.77 (s, 5H), 3.63 (br. mult., 10H), 3.39 (br. s, 4H). MS (FD) m/e=932.

Band five yielded the 3:4 oligomer 3b (FIG. 3) (pure by HPLC except for small shoulder, V$_r$=6.28 mL). $^1$H NMR (CDCl$_3$) 7.98 (d, J=7Hz, 2H), 7.67 (d, J=7Hz, 2H), 7.58 (mult, 6H), 7.38 (t, J=7Hz, 2H), 7.00 (mult, 6H), 3.97 (br. s, 4H), 3.77 (s, 10H), 3.68 (br. mult, 12H), 3.45 (br. mult, 8H). MS (FD) m/e=1116.

The baselines of all the prep TLC plates were isolated, extracted into CH$_2$Cl$_2$, filtered, and evaporated to dryness. The dark orange residue was redissolved in 3 mL of CH$_2$Cl$_2$ and silica plates, 6:4 preparative TLC (5×1000 micron silica plates, 6:4 hexane/Ch$_2$Cl$_2$). The chromatography gave predominantly one band, which was centered between two very weak bands. This center band was isolated to give a dark orange solid. The HPLC showed predominantly one peak at V$_r$=5.92 mL (1.3%). Slow recrystallization at −30° from CH$_2$Cl$_2$/Et$_2$O gave 0.005 g of the 4:5 oligomer 3c (FIG. 3) as a microcrystalline material. $^1$H NMR (CDCl$_3$) 7.98–6.99 (overlapping mult. 24H) 3.97 (br. s, 4H), 3.78 (s, 10H), 3.72 (br. s, 4H), 3.68 (br. s, 4H), 3.60 (br. s, 4H), 3.53 (br. s, 4H), 3.45 (br. s, 4H), 3.39 (br. s, 4H), 3.32 (br. s, 4H). MS (FD) m/e 1426 (FAB) m/e 1427.

EXAMPLE II

Preparation of Ruthenocenylnaphthalene Oligomers

The procedures of Example I were employed except as otherwise noted.

To a suspension of ruthenocene (0.470 g, 2.203 mmol) in 18 ml hexane was added via syringe 2.7 ml (4.06 mmol) of n-butyllithium (1.5 M in hexanes) followed by 0.61 ml (4.06 mmol) N,N,N═,N-tetramethylethylenedramine (TMEDA). The flask was stirred overnight at room temperature and the resulting suspension of 1,1'-dilithoruthenocene-TMEDA cooled to about 0° C., the supernatant removed by cannula filtration, and the residual yellow solid dissolved in 10 ml of tetrahydrofuran (THF). The supernatant was hydrolyzed with 1NHCl, the hexane layer dried over Na$_2$SO$_4$ and evaporated to give 64 mg (14%) of recovered ruthenocene. Exactly 1 molar equivalent zinc chloride (1.76 mL of a 1 M solution in ether) was then added dropwise at about 0°. A flocculent precipitate formed and persisted upon warming to room temperature. The pale yellow zincated ruthernocene suspension was stirred for 3 h, and transferred to cannula to an addition funnel on top of a three-neck flask charged with the catalyst, prepared in situ from (Ph$_3$P)$_2$PdCl$_2$ (55 mg) and DIBAL-H (0.17 mL of a 20 wt. % solution in toluene) in 2 mL THF. A solution of 1,8-diiodonaphthalene (0.679 g, 1.78 mmol) in 5 mL THF was added to this. The Zn-reagent was added portionwise over 30 min at about 0° C. The reaction mixture, a light brown suspension, was allowed to come to room temperature and stirred overnight whereupon it became homogeneous. The progress of the oligomerization was monitored by HPLC. Samples were prepared by passing an aliquot through Sep-Pak Silica cartridge with THF as the eluent. The resulting solution was diluted as needed and filtered (0.45 um filter units) before injection. The consumption of diiodonaphthalene was slow at room temperature. However, traces of oligomers with molecular weights greater than the 2:3 oligomer, 3a (FIG. 3), were detectable. Upon heating to reflux, the size and relative amounts of oligomers increases with a concomitant decrease in diiodonaphthalene. Refluxing was continued until the HPLC profile remained constant (28 h). This reaction mixture was hydrolyzed with 1N HCl at about 0°. Evaporation of the organic layer gave a brown two phase (oil-water) residue which was taken up in CH$_2$CL$_2$, washed with water and dried over Mg$_2$SO$_4$. The crude product, an amber semicrystalline syrup, was separated by preparative TLC using hexane-methylene chloride (4:3) as eluent. Nine plates were required for separation of the product into eight fractions. Fraction one gave 200 mg of diiodonaphthalene. The products from the other fractions were further purified by flash chromatography through an 18 cm column if neutral alumina (Brockmann grade III) with hexane-methylene chloride (1:1) to remove trace impurities. The oligomers, isolated in this way, are pale yellow solids. The yields reported are based on diiodonaphthalene consumed.

Band two gave 123 mg (16.6%) of 1,8-diruthenocenylnaphthalene, 1b (FIG. 1), (73% pure by HPLC, V$_r$=7.84 mL), containing the 2:2 oligomer, 4a (FIG. 1) (M =Ru). $^1$H NMR (CDCl$_3$) 4.33 (t, J=1.8Hz, 4H), 4.36 (s, 10H), 4.66 (t, J=1.8Hz, 4H), 7.28 (t, 2H), 7.67 (d, 2H), 7.87 (d, 2H).

Band three gave 74 mg (12.5%) of the 2:3 oligomer, 3a (FIG. 3), (M=Ru) (V$_r$=6.91) with a trace of athe) iodo-oligomer, 5b (FIG. 1) (M=Ru), MS (FAB) m/e=1193 for C$_{60}$H$_{43}$Ru$_3$I. $^1$H NMR of 3a, (CDCl$_3$) 4.12 (t, J=1.8Hz, 4H), 4.27 (t, J=1.8Hz, 4H), 4.33 (s, 10H), 4.46 (t, J=1.8Hz, 4H), 4.59 (t, J=1.8Hz, 4H), 6.98 (t, 2H), 7.26 (t, 2H), 7.58 (2 overlapping d's, 4H), 7.64 (d, 2H), 7.81 (d, 2H). MS (FAB) m/e=9.43, C$_{50}$H$_{38}$Ru$_3$.

Band four gave 33 mg (5.9%) of the 3:4 oligomer, 3b (FIG. 3) (M =Ru) (V$_r$=6.31 mL), pure by HPLC. $^1$H NMR (CDCl$_3$) 4.07 (t, J=1.5Hz, 4H), 4.10 (t, J=1.8Hz, 4H), 4.25 (t, J=1.5Hz, 4H), 4.32 (s, 10H), 4.40 (t, J=1.8Hz, 4H), 4.42 (t, J=1.7Hz, 4H), 4.58 (t, J=1.5Hz, 4H), 6.94 (t, 2H), 6.95 (t, 2H), 7.24 (t, 2H), 7.55 (overlapping d's, 8H), 7.63 (d, 2H), 7.80 (d, 2H). MS (FAB) m/e=1298, $C_{70}H_{52}Ru_4$.

Anal. Calcd. for $C_{70}H_{52}Ru_4$: C, 64.80; H, 4.04. Found: C, 60.44; H, 4.07.

Band five gave 19 mg (2.7%) of the 4:5 oligomer, 3c (FIG. 3) (M =Ru) ($V_r$=5.91 mL), pure by HPLC. $^1$H NMR (CDCl$_3$) 4.04 (t, J=1.8Hz, 4H), 4.06 (t, J=1.5Hz, 4H), 4.09 (t, J=1.5Hz, 4H), 4.25 (t, J=1.8Hz, 4H), 4.31 (s, 10H), 4,36 (t, J=1.8Hz, 4H), 4.38 (t, J=1.8Hz, 4H), 4.42 (t, J=1.8Hz, 4H), 4.58 (t, J=1.8Hz, 4H), 6.92 (t, 2H), 6.93 (t, 2H), 6.94 (t, 2H), 7.25 (t, 2H), 7.52 (m, 12H), 7.62 (d, 2H), 7.80 (d, 2H). Anal. Calcd. for $C_{90}H_{66}Ru_5$: C, 65.40; H, 4.03. Found: C, 64.61; H, 4.39.

Band six gave 10 mg (2%) of the 5:6 oligomer, 3d (FIG. 3) (M =Ru) ($V_r$=5.57 mL), pure by HPLC. $^1$H NMR (CDCl$_3$) 4.030, 4.035 (2 overlapping t's, 8H), 4.06 (t, J=1.5Hz, 4H), 4.08 (t, J=1.5Hz, 4H), 4.25 (t, J=1.8Hz, 4H), 4.31 (s, 10H), 4.350, 4.355 (2 overlapping t's, 8H), 4.38 (t, J=1.8Hz, 4H), 4.41 (t, J=1.8Hz, 4H), 4.58 (t, J=1.8Hz, 4H), 6.92 (m, 8H), 7.24 (t, 2H), 7.52 (m, 16H), 7.62 (d, 2H), 7.80 (d, 2H). MS (FAB) m/e=2010.9, $C_{110}H_{80}Ru_6$.

EXAMPLE III

Synthesis of Ferrocene Polymers

The procedures of Example I were employed except as otherwise noted.

A Schlenk flask was loaded with 0.191 g (1.4 mmol) of finely ground ZnCl$_2$ and the put under vacuum. Into this flask was condensed 3–5 mL of oxalyl chloride by bulb to bulb vacuum transfer. This helps to remove discoloring impurities from the oxalyl chloride. The resulting suspension was placed under argon and then brought to reflux for 2h, then allowed to equilibrate to room temperature and stirred under argon for an additional 2 h. The oxalyl chloride was removed in vacuo to yield a cream colored solid which was left under dynamic vacuum for 1 h to remove volatiles. To produce a zinc chloride compound with less discoloration, the suspension of zinc chloride in oxalyl chloride was stirred for 1 to 2 days under argon. The anhydrous ZnCl$_2$ reagent was then dissolved in 8 mL of THF to give a clear solution.

Following the standard procedure previously outlined, 0.260 g (1.4 mmol) of ferrocene was di-lithiated with n-butyllithium (2.8 mmol) in the presence of TMEDA 90.42 mL, 2.8 mmol). The resulting light orange solid was dissolved in 10 mL of THF, yielding a dark orange solution. This solution was treated with ZnCl$_2$ solution via cannula transfer and allowed to stir 1 h prior to use. The resulting reagent, an orange suspension, was transferred to a three neck, 100 mL flask fitted with a stopper, a reflux condenser, and an additional funnel.

The Pd(O) catalyst was prepared in a separate flask by reducing 0.049 g (0.07 mmol, 5 mole% based on ferrocene) with 2 equivalents of DIBAL-H (0.14 mmol, 0.14 mL of 1.0 M solution in toluene) in 2 mL of THF. The black solution of Pd(O) was transferred into the flask containing ferrocenylzinc reagent and the resulting suspension was brought to reflux.

As the solution began to reflux, 0.532 g of 1,8-diiodonaphthalene as a solution of 10 mL of THF was slowly dripped into the reaction over the course of 5 h. When the addition is complete, the reaction was allowed to continue refluxing with periodic monitoring by gel permeation HPLC (500 and 100 A Ultrastyragel columns linked in series, THF at 1.0 mL/min). After 3 h, the reaction yielded molecular weight distribution typical of the 3:4 and 4:5 range of oligomers. Typically, the 1,8-diferrocenylnaphthalene dominated these reactions, but here it was seen in only small amounts. At this point, 5 mole% of the Pd(O) catalyst was added.

After 12 h, a large amount of orange precipitate formed. Characterization of the product distribution by HPLC was unreliable in this solvent. The reaction was run for a total of 36 h at reflux and then worked up as described for the other synthesis.

Separation of the oligomers by column chromatography gave poor resolution due to the wide range of molecular weights and the low solubility of the higher oligomers in solvent combinations which resolve the lower molecular weight species. The product distribution was determined by gel permeation chromatography performed in toluene which readily solubilized all of the fractions (500 and 100 Å ultrastyragel columns in series, toluene at 1.0 mL/min). A table of retention volumes in toluene for the known oligomers appears in Table 2.

TABLE 2

Summary of Retention Volumes in Toluene For the Ferrocene Oligomers[a]

| Oligomer | Retention Volume (mL) |
|---|---|
| 1:8 Diferrocenylnaphthalene (1a) (FIG. 1) | 18.36 |
| 2:2 Oligomer (4a) (FIG. 4) | 17.84 |
| 2:3 Oligomer (3a) (FIG. 3) | 16.72 |
| 3:3 Oligomer (4b) (FIG. 4) | 16.40 |
| 3:4 Oligomer (3b) (FIG. 3) | 14.15 |
| 4:5 Oligomer (3c) (FIG. 3) | 13.80 |

[a]500 and 100 ÅUltrastyragel columns in series, using toluene at 1 mL/min.

Extracting the crude product with diethyl ether gave the first fraction which contained all of the lower molecular weight oligomers (1,8-diferrocenyl-naphthalene through the 3:4 oligomer), as confirmed by the distribution of the retention volumes in the HPLC.

The remaining solid was then washed with benzene to give the second fraction (56 mg). This fraction contained a small amount of oligomer in the 3:4 and 4:5 range. Molecular weight determination of this fraction gave $M_w$=1600, $M_n$=940.

The third and final fraction was collected by soxhlet extraction of the remaining solids in benzene to give 55 mg of product as a dark red powder. A molecular weight determination carried out on this material gave $M_w$6000, $M_n$=3600.

EXAMPLE IV

Chemical Reversibility of Ferrocenyl napthalene Oligomers

This Example illustrates the degree of electronic interaction between the metal centers of species in the polymer chain. The effect of increasing chain length on the oxidation potential of the metal centers was examined by cyclic voltametry. Table 3 gives half wave potentials, determined from peak potentials, for alpha-naphthyl-ferrocene and various oligomers (FIGS. 1 and 3); compounds 1a, 3a, 3b.

Figure 3:
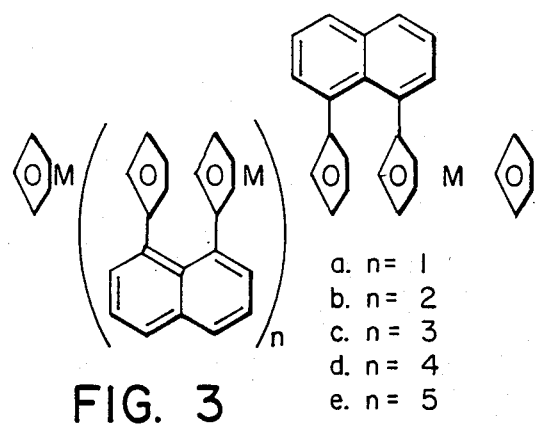
FIG. 3 illustrates the general formula for the low molecular weight polymers of this invention that contain unequal numbers of naphthalene and metallocene units.

All of the redox reactions show good chemical reversibility. Polymers of the type as shown in FIG. 3 (compound 3b) show three distinct waves at a scan rate of 100mv/second. There is also a progressive decrease in half wave potentials between the first and second oxidation potentials with growth of the chain length. This change is, however, sharply diminished with further increases in chain length. Moreover. there is a progressive diminution in the differences in half wave potentials for successive oxidation steps within the naphthylferrocene polymer as shown in Table 1. These results suggest that charge delocalization exist in these polymers between the metal centers, either by direct interaction of the cofacial pi oribtals of the metallocene units, or less directly by electronic relay through the aromatic backbone of the naphthalene units.

EQUIVALENTS

Those skilled in the art will recognize, or be able to ascertain, using no more than routine experimentation, many equivalents to the specific embodiment of the invention described herein. such equivalents are intended to be encompassed by the following claims.

TABLE 3

Half Wave Potentials for α-Naphthylferrocene and Related Oligomers[a]

| Compound | E½ (1) | E½ (2) | E½ (3) |
|---|---|---|---|
| α-naphthylferrocene | 0.548 | — | — |
| 1a (FIG. 1) | 0.389 | 0.597 | — |
| 3a (FIG. 3) | 0.296 | 0.461 | 0.592 |
| 3b (FIG. 3) | 0.285 | 0.401 | 0.561 |

[a]Measurements were carried out using 0.1 M tetra-N—butylammonium perchlorate in methylene chloride as supporting electrolyte.

I claim:

1. A polymer represented by

where $R^1$ represents a ligand selected from the group consisting of cyclopentadienyl, phenyl, and cycloheptatrienyl ligands, $R^2$ represents a monovalent radical selected from the group consisting of the cyclopentadienyl, $\eta^6$-arene and cycloheptatrienyl rings, M represents a transition metal, n is an integer of 2 or more, and R represents a divalent radical bound to the individual metallocene units at two positions.

2. A polymer of claim 1 wherein M is selected from the group consisting of all transition metals from groups VIb, VIIb and VIII of the Periodic Table of The Elements.

3. A polymer of claim 1 wherein R is a naphthalenylene radical bound to the individual metallocene units at its 1,8 positions.

4. A polymer of claim 1, wherein R is a divalent radical selected from the group consisting of the phenylene radical bound to the individual metallocene units at its 1,4 positions, the biphenylene radical bound at its 4,4' positions and the anthracenylene radical bound at its 9,10 positions.

5. A cofacial metallocene polymer represented by:

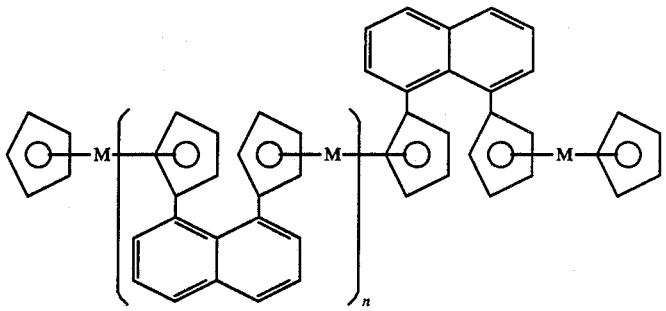

where M represents a metal selected from the group consisting of all transition metals from groups 6b, 7b, and 8 of the Periodic Table of Elements; and n represents an integer of 2 or greater.

6. A process for preparing a metallocene polymer which comprises:
reacting a bis(chlorozinc)metalocene complex with a dihalogenated aromatic to form polymeric metallocenes.

7. A process of claim 6, wherein the bis(chlorozinc)metallocene complex is reacted with a di-halogenated aromatic in the presence of a nickel or palladium catalyst.

8. A process of claim 6, wherein the bis(chlorozinc)metallocene metallocene complex is a cyclopentadienyl transition metal complex and where the transition metal is selected from the group consisting of group VIb, VIIb and VIII of the Period Table of the Elements.

9. A process of claim 6, wherein the dihaloaromatic is selected from a group consisting of 1,8 dihalonaphthalene, 1,4 dihalobenzene, 9,10 dihaloanthracene and 4—4' dihalobiphenyl.

10. A process of claim 6, wherein the halogen is selected from a group consisting o f iodine, bromine and chlorine.

11. A process for producing polymers of ferrocenylnaphthalene which comprises reacting a
bis(chlorozinc)ferrocene complex in the presence of a dichloro-bis (tripenylphosphine)palladium with 1,8 diiodonaphthalene to form a polymer of ferrocenylnaphthalene.

12. A process for producing polymers of ruthenocenylnaphthalene, which comprises:
reacting a bis(chlorozinc)ruthenocene complex with 1,8 diiodonaphthalene in the presence of dichlorobis(triphenylphosphine) palladium to form polymers of ruthenocenylnaphthalene.

13. A process for preparing a cofacial ferrocenylnaphthalene polymer which comprises the steps of:
reacting a dilithiated ferrocene with anhydrous zinc chloride, the anhydrous zinc chloride prepared by condensing an acid chloride drying reagent with powdered zinc chloride under an inert atmosphere, removing the acid chloride drying reagent, further reacting the product bis(chlorozinc)ferrocene complex in the presence of dichloro-bis-(triphenylphosphine) palladium catalyst with 1,8 diiodonaphthalene at temperature sufficient to reflux; and thereafter recovering the product by removing the solvent and extracting the polymer.

14. A process for preparing a stacked, cofacial ruthenocenylnaphthalene polymer which comprises the steps of:

reacting a bis(chlorozinc)ruthenocene complex at a temperature in the range from about 0 to about 80° with 1,8 diiodonaphthalene in the presence of dichloro-bis(triphenylphospine) palladium catalyst;

further warming the mixture, heating to reflux;

hydrolyzing the reaction mixture with HCL at about room temperature; and removing the solvent and extracting the polymer.

15. A process for preparing a stacked, cofacial ferrocenylnaphthalene polymer which comprises the steps of:

reacting a dilithiated ferrocene with anhydrous zinc chloride, the anhydrous zinc chloride prepard by condensing on acid chloride drying reagent with powdered zinc chloride under an inert atmosphere;

removing the acid chloride drying reagent;

further reacting the product bis(chlorozinc)-ferrocene complex with 1,8 diiodonaphthalene in the presence of Pd(O) at reflux temperature: and separating the resultant ferrocenylnaphthalene polymer.

16. A metallocene polymer whose individual metallocene units are held proximate and cofacial produced in accordance with the process of claim 6.

17. A metallocene polymer of claim 16 wherein the metallocene units contain a transition metal selected from the group consisting of groups 6b, 7b and 8 of the Periodic Table of the Elements.

18. A stacked metallocene polymer based on 1,8 substitution of naphthalene whose substituted cyclopentadienyl rings are rotated from a conformation perpendicular to the naphthalene backbone, produced in accordance with claim 6.

* * * * *